United States Patent [19]

Padovani

[11] Patent Number: 4,872,826
[45] Date of Patent: Oct. 10, 1989

[54] APPARATUS FOR OBTAINING A NEGATIVE PRESSURE IN CHAMBERS FORMED BY A FLAT EXTRACTOR PLATE SUPPORTING HOLLOW THERMOFORMED OBJECTS

[75] Inventor: Pietro Padovani, Todeschini, Italy
[73] Assignee: O.M.V. S.p.A. (Officine Meccaniche Veronesi), Parona, Italy
[21] Appl. No.: 201,556
[22] Filed: Jun. 1, 1988
[30] Foreign Application Priority Data Jun. 5, 1987 [IT] Italy ................... 84940 A/87

[51] Int. Cl.⁴ ........................... B29C 51/44
[52] U.S. Cl. ................... 425/388; 264/553; 425/403.1; 425/437; 425/DIG. 60
[58] Field of Search ........... 264/553, 517; 425/556, 425/388, 403.1, 437, DIG. 60

[56] References Cited

U.S. PATENT DOCUMENTS 4,266,925 5/1981 Book ................. 425/DIG. 60
4,473,526 9/1984 Buhler et al. ............ 264/517
4,560,339 12/1985 Padovani ............. 425/437

FOREIGN PATENT DOCUMENTS 2149717 6/1985 United Kingdom .

Primary Examiner—Jay H. Woo
Assistant Examiner—Timothy W. Heitbrink
Attorney, Agent, or Firm—Ladas & Parry

[57] ABSTRACT

An apparatus for obtaining a negative pressure in chambers formed by a flat extractor plate supporting frustoconical or truncated pyramidal objects thermoformed from a sheet of synthetic material, embodying a flat extractor plate for hollow frustoconical or trucated pyramidal objects which when resting their rims on the flat surface of the extractor plate form chambers, wherein a suction unit is connected with said chambers by means of a pipe and a connecting cavity and wherein are provided a shut-off valve and an air intake(20) adjustment valve between the unit and the said valve, wherein each chamber is provided with at least one intake for atmospheric air into the chambers (17), wherein the cross-section of the intakes (20) is variable.

13 Claims, 2 Drawing Sheets

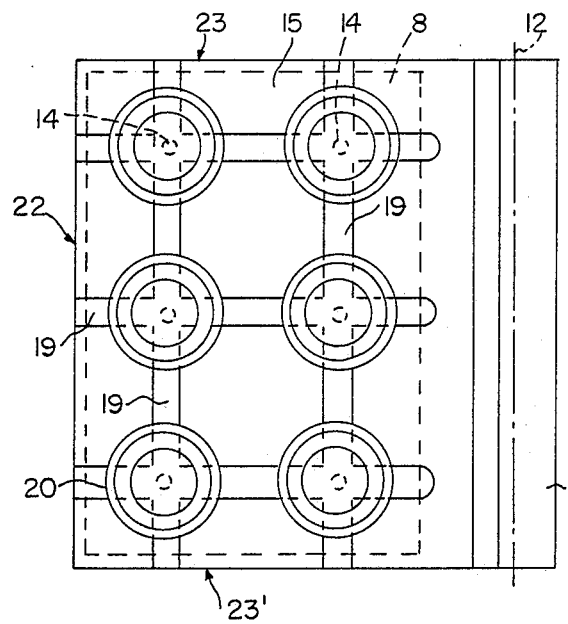
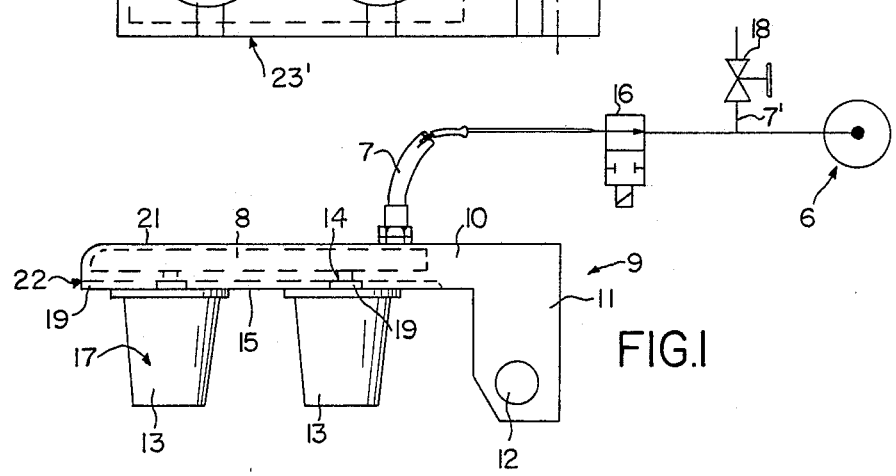
FIG.2
FIG.1
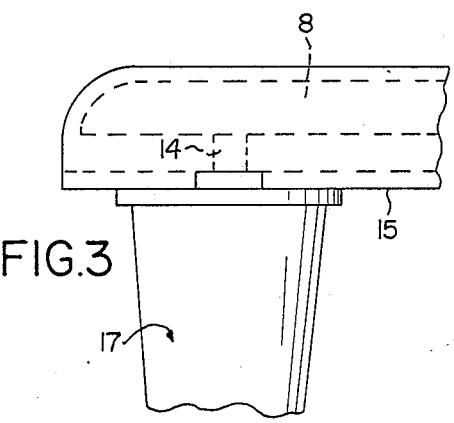
FIG.3

APPARATUS FOR OBTAINING A NEGATIVE PRESSURE IN CHAMBERS FORMED BY A FLAT EXTRACTOR PLATE SUPPORTING HOLLOW THERMOFORMED OBJECTS

The invention relates to an apparatus for obtaining a negative pressure in chambers formed by a flat extractor plate supporting frustoconical or truncated pyramidal objects thermoformed from a sheet of synthetic material.

Objects obtained by the thermoforming of synthetic sheet material, such as cups, ice cream tubs, dishes, for example, have thin walls which do not permit the creation of appreciable negative pressures within them because such pressures would deform them rendering them unusable.

In the apparatus currently in use these objects are made to adhere to a flat plate extractor by their rims through the use of mechanical means, and a slight negative pressure is then created within them by drawings out the air for a short time, after which the suction equipment is shut off so as not to crate a vacuum within the objects and thus bring about collapse of their side walls.

Using these apparatus it is not possible to maintain a constant slight internal negative pressure which can be withstood by the wall of the objects, because the contact surfaces between the objects and the plate are very limited and allow air to seep from the exterior to the interior. In fact the rims of these objects are in most cases curved and in any event of little thickness. As a consequence adhesion of the object to the extractor is precarious and air seepage frequently causes equalization of the pressures within and outside the object, reducing the forces holding the object gently sucked against the plate, a situation which is highly prejudicial to the stability of the position of the object with respect to the extractor.

This disadvantage results in the objects being easily displaced from the position in which they were originally held, during movements of the extractor, when the objects are supported by the extractor, that is when they are held by the extractor they become detached from it.

These disadvantages are prejudicial to reliable and correct removal of the objects from the thermoforming machines and render their positioning on stacking channels precarious.

In the thermoforming machines provided with an extractor plate described in British Patent No. 2149717 by the same applicant, the negative pressure is brought about, in accordance with the known art, by adjusting the suction and shutting it off upstream of the suction holes provided on the extractor, for which reason it is essential to have an optimum seal between the object and the plate. In addition to this it has proved particularly difficult to obtain these low negative pressures using the known art.

Adjustment and shutting off the suction upstream of the suction holes in the extractor plate is unable to cause objects of the type mentioned previously to adhere to a flat extractor plate by means of air suction and to form chambers. The suction must in fact be considerable in order to draw the objects towards the extractor, with the result that when the objects impact upon the extractor plate this creates a considerable negative pressure within the objects, which as mentioned previously is prejudicial to the integrity of their walls.

The object of the invention is to at least minimize the aforesaid disadvantages. According to the present invention there is provided an apparatus for obtaining a negative pressure in chambers formed by a flat extractor plate supporting frustoconical or truncated pyramidal objects thermoformed from a sheet of synthetic material, comprising a flat extractor plate for hollow frustoconical or truncated pyramidal objects which when resting their rims on the flat surface of the extractor plate form chambers, wherein a suction unit is connected with said chamber by means of a pipe and a connecting cavity and wherein are provided a shut-off valve and an air intake adjustment valve between the unit and the said valve, wherein each chamber is provided with at least one intake for atmospheric air into the chambers, wherein the cross-section of the intakes is variable.

The main advantage derives from the fact that the apparatus according to the invention makes it possible to cause hollow frusto-conical or truncated pyramidal objects which are only capable of supporting slight negative pressure to adhere to an extractor plate by means of air suction, without the objects being subjected to deformations which are harmful to their integrity.

A further advantage of the invention arises from the fact that the objects may be kept stably adherent to the flat plate.

The present invention will be further illustrated, by way of example, with reference to the accompanying drawings, in which:

FIG. 1 is a side view of a flat plate extractor attached to a suction unit of a considerable power;

FIG. 2 is a view of the extractor of FIG. 1 from below;

FIG. 3 is an enlarged view of part of the extractor illustrated in FIG. 1; and

Figure 5:
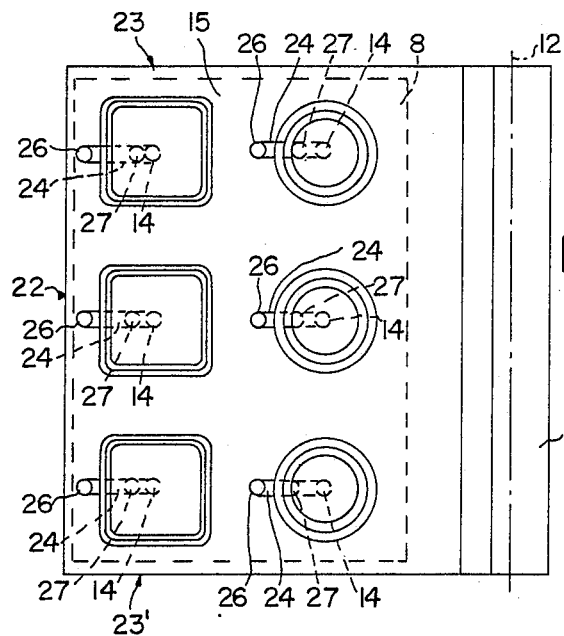
FIGS. 4 and 5 are views corresponding to FIGS. 1 and 2 of an alternative embodiment in accordance with the invention.

Bearing in mind that the same reference numerals in the various figures correspond to identical or equivalent parts, it will be seen in FIG. 1 that a suction unit 6 of considerable power is connected by means of a pipe 7 to a connecting cavity 8 within an extractor 9 having a flat plate 10, an arm 11 and pin 12. This extractor is able to perform various movements, such as insertion between the dies of a press in order to extract cut thermoformed cups 13, as described in the abovementioned British patent.

Connecting cavity 8 connects the powerful suction unit 6, for example a pump, fan or the like, with chambers 17, which are formed by objects 13 and plate 10, through holes 14 made in the lower part 15 of plate 10 at the intersections of channels 19 of rectangular cross-section and by means of a pipe 7.

A valve 16 is placed in pipe 7 in order to connect or shut off chambers 17 from suction unit 6, while a valve 18, placed on branch 7 of pipe 7 is provided between the said valve and unit 6 in order to control the suction flow of atmospheric air.

Chambers 17 are each formed by side walls and the bases of cups 13 and a portion of the lower face 15 of plate 10 bounded by the rims of the cups.

These chambers 17 are formed when the flat extractor plate positions itself, by means of the movements described in the abovementioned British patent, between the two dies of the press, which is not illustrated in the drawings, between which the objects, which have been formed and cut out, lie. As a result of the air suction produced by suction unit 6 the objects are drawn towards and adhere to the lower face 15 of plate 10 by their rims.

As will be seen in FIG. 2, channels 19 which are present in the lower face 15 of plate 10 intersect at right angles at the locations of holes 14 which place the said channels in communication with connecting cavity 8, which is in turn connected to suction unit 6.

In relation to the rim of the overlaying cup, these channels 19 form four atmospheric air inlets 20 for ech cup 13. The cross-section of each inlet 20 may be varied by means of plates, not shown in the drawings, of different thickness which can be removably located in the base of the channels opposite the rim of the object.

The air inlets 20 allow atmospheric air to enter chambers 17 in an amount which has been predetermined in relation to the weight and volumetric dimensions of the chambers.

The negative pressure which is to be created within the chambers 17 is obtained and held almost constant by means of a high flow of air through the chambers, by drawing in external air through inlets 20 and at the same time removing the same amount of inlet air from the chambers by means of an adjustable suction unit 6 acting via holes 14.

This negative pressure must lie between that required to maintain the adhesion of cups 13 to the extractor and the critical negative pressure causing collapse of objects, so that no deformations which are prejudicial to their walls are produced in the cups 13.

The device is adjusted in two ways, the first adjustment being made by determining a mean value for the flow V of the suction unit by adjusting the cross-sectional dimensions of inlets 20.

After the dimensions of the cross-sections of the air inlets have been selected, a second adjustment is made by adjusting the suction flow V by acting on an appropriate control valve 18.

These adjustments will be described in more detail below in relation to cups 13 which are sucked onto, that is caused to adhere to, the bottom surface of plate 10.

The first adjustment, for a given suction unit flow, is obtained by adjusting the dimensions of the cross-sections of the air intakes 20 in relation to the weight of the object which is to be supported. In fact, if V is the suction unit flow and F is the sum of the cross-sections of the air inlets, then on the basis of known formulae for the flow of fluids through an orifice as a result of slight differences between interna and externel pressure:

$$\Delta = X \times V^2 / F^2$$

where X is a constant which depends on the mechanical characteristics of the device and the physical characteristics of teh fluid flow and can easily be determined by experimental measurements of the value of $\Delta P$ as the cross-sections F are varied.

The minimum negative pressure required to maintain adhesion between a cup 13 and the extractor plate is given by the known formula expressing the equilibrium of a body subjected to the force of its own weight G and a suction force $\Delta P \times F$:

$$\Delta P = G / S_0$$

where $S_0$ is the cross-section across which the pressure difference P applies.

When the constant X has been determined experimentally, the following relationship is obtained by comparing the above two formulae and equalising the corresponding second members:

$$G / S_0 = X \times V^2 / F^2$$

and from this it is possible to obtain the function which governs the relationship between the sum of the cross-sections F and the weight G of cups 13 for a predetermined air flow V.

The second adjustement can be made by acting on valve 18 which is used to vary the suction flow of air V when the inlet cross-section F have already been selected, that is for constant F.

The relationship between the weight G of the object supported in relation to the variable flow V is obtained from the above formulae:

$$G = S_0 \times X \times V^2 / F^2$$

The corresponding maximum value for the weight of the object which is to be supported is found for the flow $V_{max}$ while the corresponding minimum value of the weight of the object which is to be supported is found from flow $V_{min}$. Thus without changing $S_0$ different objects of weight lying within the range determined above can be supported by the same plate.

It is also clear that the critical negative pressure for collapse of the object, the maximum which can be withstood by cups 13, depends on the physical properties of the object, that is on its shape, its dimensions, which determine the volume of chambers 17, and its thickness, as well as the strength properties of the synthetic material used, and that these can easily be determined by experiment.

Figure 4:
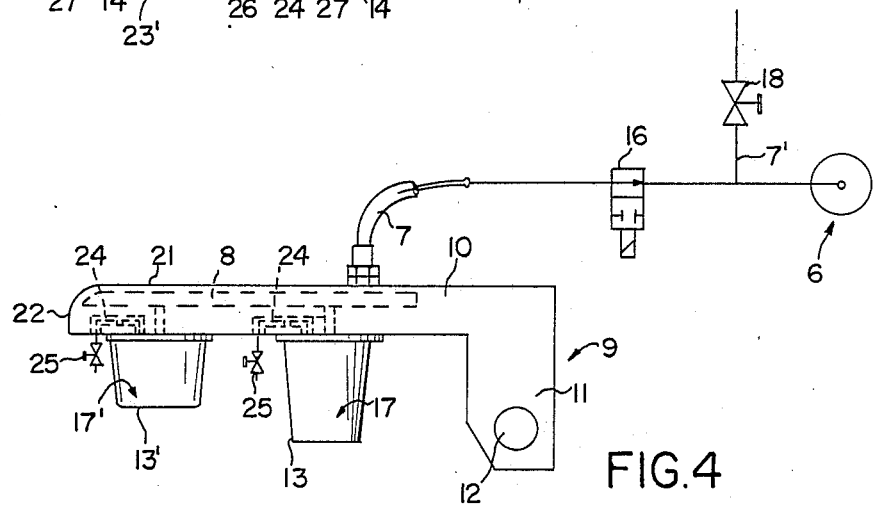

In the embodiment of the apparatus according to the invention illustrated in FIG. 4 and 5, the plate has a connection cavity 8 which is connected by means of holes 14 to the lower part 15 of said plate, and by means of a pipe 7 to a powerful suction unit 6. The main characteristic of this embodiment is that a duct 24, the ends 26, 27 of which are outside and inside the chamber respectively, is constructed within flat plate 10. End 26 is therefore an air intake and the flow of air entering each of the abovementioned chambers can be adjusted by means of a valve 25. In this way objects of different shapes and volumes can be extracted using the same plate.

This valve 25, which is illustrated diagrammatically by a valve in FIG. 4, may be constructed in various ways. It may also be of the slide type, sliding parallel to surface 15 of plate 10, but however it is constructed it is advisable that this valve should lie between above-mentioned surface 15 and opposing surface 21 without projecting beyond the thickness of the plate itself so as not to prejudice the various movements of the extractor as described in the cited British patent.

There is nothing to prevent opening 26 being placed on any of the other surfaces 22,23,23' of plate 10 without any prejudice to the process according to the invention, because it is sufficient that the said opening should be outside the contact area of the rims of the cups and therefore in direct communication with atmospheric air.

It is also clear to one skilled in the art, that the use of any type of valve which may be contained within the thickness of plate 10 instead of 25 indicated in the drawing does not alter the nature of this invention.

I claim:

1. Apparatus for holding thermoformed objects via a negative pressure, said apparatus comprising:
   a flat extractor plate for holding hollow frustoconical or truncated pyramidal objects, said objects having rims, the plate having a connecting cavity and a lower face, the objects when resting their rims on the lower face of the extractor plate forming chambers;
   a pipe;
   a suction unit connected to said chambers by said pipe and said connecting cavity, the suction unit producing a suction to adhere the objects to the lower face of the flat extractor plate;
   a shut off valve disposed on the pipe for connecting or shutting off the chambers from the suction unit;
   an air intake adjustment valve between the suction unit and the shut-off valve; and
   atmospheric air intakes disposed on the flat extractor plate for permitting aerial communication with said chambers, the atmospheric air intakes having a cross-section that is variable and adjustable.

2. Apparatus as claimed in claim 1, wherein the atmospheric air intakes are located on the lower face of the extractor plate to which the objects adhere.

3. Apparatus as claimed in claim 1, wherein the atmospheric air intakes are located on a face of the extractor plate other than a face to which the objects adhere.

4. Apparatus as claimed in claim 1, wherein each chamber is connected, by means comprising at least one open channel made in a face of the extractor to which the objects which are to be extracted adhere, to at least one atmospheric air intake bounded by the channel and a part of the rim of the object overlying the channel.

5. Apparatus as claimed in claim 1, wherein the cross-section of the atmospheric air intake can be varied by means comprising plates of different thicknesses which can be removably located in the base of a channel in a position corresponding to a part of the rim of the object overlying the channel.

6. Apparatus as claimed in claim 1 wherein each chamber is connected, by means comprising at least one duct in the extractor plate, to at least one atmospheric air intake.

7. Apparatus as claimed in claim 6 further comprising a valve for varying said cross-section of the atmospheric air intake, said extractor having an opposing surface, said valve located between the lower face and the opposing surface.

8. Apparatus as claimed in claim 2, wherein each chamber is connected, by means comprising at least one duct in the extractor plate, to at least one atmospheric air intake.

9. Apparatus as claimed in claim 3, wherein each chamber is connected, by means comprising at least one duct in the extractor plate, to at least one atmospheric air intake.

10. Apparatus as claimed in claim 6 further comprising a shutter for varying said cross-section of the atmospheric air intake, said extractor having a opposing surface, said shutter located between the lower face and the opposing surface.

11. Apparatus for holding thermoformed objects via a negative pressure, said apparatus comprising:
    a flat extractor plate, said plate having holes;
    a suction unit;
    a pipe connecting the flat extractor plate to the suction unit;
    an air intake adjustment valve disposed on the pipe to regulate a vacuum exerted through the holes of the extractor plate by the suction unit atmospheric air intakes disposed on the extractor plate, wherein the placement of a rim of a frustoconical object against the extractor plate forms a chamber between the walls of the object and the extractor plate, the atmospheric air intake having a cross-sectional opening thereon is variable and controls the vacuum exerted on the chambers independent of the section exerted by the section unit.

12. Apparatus as claimed in claim 11 wherein the cross sectional opening of the atmospheric air intake can be varied by means comprising plates of different thickness which can be removably located on the extractor plate.

13. Apparatus as claimed in claim 12 wherein each chamber is connected by means comprising at least one duct in the extractor plate to at least one atmospheric air intake.

* * * * *